United States Patent [19]

Moore et al.

[11] Patent Number: 5,248,552
[45] Date of Patent: Sep. 28, 1993

[54] MOLDING CORE
[75] Inventors: Timothy M. Moore, Silvis; Gerbrig W. Van Der Woude, Rock Island, both of Ill.
[73] Assignee: Advanced Plastics Partnership, Moline, Ill.
[21] Appl. No.: 981,893
[22] Filed: Nov. 23, 1992

Related U.S. Application Data

[60] Continuation of Ser. No. 750,958, Aug. 28, 1991, abandoned, which is a division of Ser. No. 551,769, Jul. 11, 1990, Pat. No. 5,089,186.
[51] Int. Cl.$^5$ ................................................ B32B 9/00
[52] U.S. Cl. ................................ 428/323; 428/325; 428/327; 428/532; 428/913; 264/221; 264/317; 249/61; 249/62; 164/15
[58] Field of Search ............... 428/323, 532, 913, 325, 428/327; 264/221, 317; 164/15; 249/61, 62

[56] References Cited

U.S. PATENT DOCUMENTS

| | | | |
|---|---|---|---|
| 1,589,617 | 6/1926 | Austin | 501/149 |
| 1,902,627 | 3/1933 | Elbogen | 264/221 |
| 2,303,303 | 11/1942 | Schleicher | 264/317 |
| 2,401,760 | 6/1946 | Heyroth | 264/221 |
| 2,407,280 | 9/1946 | Hyman, Jr. | 249/61 |
| 3,021,565 | 2/1962 | Bowman | 264/221 |
| 3,046,147 | 7/1962 | Hathaway, Jr. et al. | 106/38 G |
| 3,094,422 | 6/1963 | Reinhold | 264/D45 |
| 3,149,383 | 9/1964 | Seyfer et al. | 249/61 |
| 3,645,491 | 2/1972 | Brown et al. | 249/61 |
| 3,764,575 | 10/1973 | Anderko et al. | 164/36 |
| 3,765,920 | 10/1973 | Humphrey | 106/288 B |
| 3,857,715 | 12/1974 | Humphrey | 106/92 |
| 4,078,599 | 3/1978 | Makiguchi et al. | 164/41 |
| 4,088,723 | 5/1978 | Norton | 264/45.5 |
| 4,194,918 | 3/1980 | George et al. | 106/80 |
| 4,329,177 | 5/1982 | George | 106/38.35 |
| 4,391,642 | 7/1983 | Stevenson et al. | 106/38.25 |
| 4,399,858 | 8/1983 | Kurabe et al. | 164/16 |
| 4,438,804 | 3/1984 | Aiga et al. | 164/522 |
| 4,514,532 | 4/1985 | Hsu et al. | 428/528 |
| 4,617,977 | 10/1986 | Mills | 164/30 |
| 4,638,845 | 1/1987 | Sato et al. | 164/12 |
| 4,659,526 | 4/1987 | Shimaguchi et al. | 264/86 |
| 4,763,720 | 8/1988 | Sakamoto et al. | 164/525 |
| 4,808,360 | 2/1989 | Natori et al. | 264/221 |
| 4,871,497 | 10/1989 | Natori et al. | 264/317 |
| 4,904,423 | 2/1990 | Foreman | 264/25 |
| 4,917,846 | 4/1990 | Takase et al. | 264/130 |
| 4,922,991 | 5/1990 | Pitcher et al. | 164/36 |
| 4,925,492 | 5/1990 | Kelkar et al. | 106/38.55 |

FOREIGN PATENT DOCUMENTS

| | | |
|---|---|---|
| 3-39183 | 11/1989 | European Pat. Off. |
| 50-28057 | 9/1975 | Japan |
| 52-61126 | 5/1977 | Japan |
| 61-258707 | 11/1986 | Japan ........................ 264/317 |
| 62-144846 | 6/1987 | Japan |
| 64-31552 | 2/1989 | Japan |
| 1-258841 | 6/1989 | Japan |
| 550216 | 3/1977 | U.S.S.R. |
| 580057 | 11/1977 | U.S.S.R. |
| 2074065 | 10/1981 | United Kingdom |

OTHER PUBLICATIONS

Modern Plastics Oct. 1989 pp. 46-52.
Plastics Technology Apr. 1987; pp. 21, 23, 25.
Modern Plastics Dec. 1989, p. 114.
Adiosil/Moroc Sodium Silicate Binders Oct 1989.
Japanese Patent Abstract JP 58032540 (Shinto Kogyo KK) Feb. 25, 1983.
Japanese Patent Abstract JP 59141342 (Komatsu Seisakusho KK) Aug. 14, 1984.
Swiss Patent Abstract SU 707032 (Coal Equipment Res Des) Jul. 23, 1987.
Modern Plastics International, Nov. 1989, pp. 7-8.
Translation of Japanese Kokai SS-36031, published Mar. 1980.

*Primary Examiner*—Patrick J. Ryan
*Assistant Examiner*—Abraham Bahta
*Attorney, Agent, or Firm*—Lockwood, Alex, FitzGibbon & Cummings

[57] ABSTRACT

A method of removing a core from a molded product in which the core is formed of a particulate inert material, such as sand, bound together by a cured binder of a water soluble carbohydrate alone or mixed with a silicate is disclosed. The silicate is preferably an alkali earth metal silicate, preferably sodium silicate, and the carbohydrate is preferably a saccharide or starch. The binder is cured by heat. The core and molded product are exposed to water, preferably heated water in a bath or steam, to rapidly disintegrate the core and remove it from the molded product.

10 Claims, 1 Drawing Sheet

MOLDING CORE

This application is a continuation of application Ser. No. 07/750,958, filed Aug. 28, 1991, now abandoned, which application was a division of Ser. No. 07/551,769, filed Jul. 11, 1990, now U.S. Pat. No. 5,089,186.

BACKGROUND AND SUMMARY OF THE INVENTION

The present invention is directed to a method for the removal of a molding core from a molded product after the product has been molded and a cured core and product made thereby.

Over the years considerable attention has been directed to the development and expansion of lost core technology for the molding of products having complex shapes, undercuts or negative drafts or complex cavity configurations. In lost core technology such complex shapes and configurations which cannot typically be formed utilizing permanent, reusable molding forms are formed by using a shaped core or other mold form on a one time basis to form the portion of the product which is of complex configuration and is then removed from the complex portion of the molded product by disintegrating the core away from the molded product.

Various materials and procedures have been employed in the forming and removal of such cores, all of which have their disadvantages.

One such prior procedure involves the use of low melt metals, such as tin, bismuth or other low melt alloys. In this procedure the low melt metal is first shaped into the negative of the complex shape which is to be present in the finished molded product. This metal core is then positioned in the mold and the material from which the finished product is to be molded is pored or injected into the mold about the core. Once the material from which the product is to be made has solidified, the molded product together with the core are removed from the mold and are heated to melt the core away from the finished product.

This low melt metal procedure suffers a number of disadvantages. In the first instance the procedure can only typically be employed in the molding of materials which are of a higher melt temperature than the low melt metal core material. Thus, the procedure is not generally usable in the molding of plastic polymers which have a lower melt or decomposition temperature than the metal of the core. Another disadvantage is that the heat and pressures during molding tend to deform the core. Moreover, the core material is heavy and expensive, and it may be toxic. Therefore, the low melt metal is difficult to handle and process. The low melt metal procedures are also energy intensive requiring large amounts of heat in the melting process, and they frequently require high temperature oil baths which are both expensive and hazardous. The low melt metal procedures are also difficult to control during the core removal to prevent damage to the molded end product, and the low melt metals are hard to reclaim. Still another disadvantage is that the low melt metal procedures typically require relatively long periods of time for the removal of the core which may be upwards of 45 minutes or more.

Water soluble polymers, such as amorphous acrylic base copolymers, have also been employed as core materials. These water soluble polymers represent a substantial improvement over the low melt metal procedures because they are simpler to tool and they enjoy a reduction in material costs, weight and toxicity. However, they are generally only capable of use in the molding of plastic polymers because the typical melt temperatures of the water soluble polymers is about 350°–410° F. Moreover, the water soluble polymer core itself must typically be hollow to allow the water to enter the core which is to dissolve the core for removal. Thus, the core must usually be formed by fusing two pieces together with the attendant disadvantages of fusing and positioning of the core parts for fusing. Also because the core is hollow, it is not as strong as a solid core would be. The water soluble polymer cores also require a considerable time for removal of 15–20 minutes or more, and they are difficult to preheat due to their relatively low melt temperature and the possibility of flexing or distortion of the core. Another disadvantage of the water soluble polymer cores is their relatively high cost, although they may be reclaimable upon removal.

Polymer cores have also been utilized which are removable with chemical solutions or acids. These cores also suffer the low temperature melting and relatively high expense disadvantages, and they are not usually subject to reclamation. Moreover, the chemical solvents or acids present their own disadvantages in handling, storage, expense and disposal.

Cores have also been utilized for the molding of high temperature materials, i.e. metals, in which the core is formed of sand which is bound into its discrete desired configuration by binders including sodium silicate and a sugar, such as dextrose. In these sodium silicate-dextrose bound cores, once the molded product has been formed, it and its core are removed from the mold and vibrated to disintegrate the core. The purpose of the sugars in these vibrationally removed cores is to provide a component material in the core which will decompose when exposed to the high molten metal temperatures during molding of the products to weaken the core as the metal is solidifying so that the core will more rapidly disintegrate when subjected to the subsequent vibration.

The principal disadvantage of these vibrationally removed cores is the expense and power consumed in imparting the vibrational energy to the molded product and its core and the corer once it is removed, is difficult to reclaim due to the presence of the sodium silicate and the core fragments which may still be bound together to some extent. Moreover, the application of vibration is not well suited to plastic molded products due to the undue stresses which must be imparted to the plastic during vibration and the reduced impact qualities in the lighter more resilient plastic products as opposed to metal products. Such reduced impact qualities extend the time needed for core removal. Indeed, even the use of vibratory techniques for removal of the core from metal molded products may take considerable periods of time.

In the present inventions most if not all of the aforementioned disadvantages are avoided. In the method of the present invention, a core may be employed with equal facility for the molding of product materials which range over a wide range of melt temperatures, including ferrous metals of high melt temperatures at the high end of the range to low melt plastic polymers, such as polyethylene, at the low end of the range. In the method of the present invention, the cores are of a relatively light weight, are easily handled and inexpensive, and the core material is easy to reclaim and reuse following removal. In the method of the present invention, temperature control is simple and the core forming and removal is not energy intensive. Moreover, materials employed in the method of the present invention are neither toxic nor do they present environmental concerns. Significantly, in the method of the present invention, the core may be easily and rapidly removes in most cases in less than a minute from the molded product simply by immersing the molded product and core in a plain water bath. In the method of the present invention, the core may be either solid or hollow, but core parts need not be fused as in other prior procedures. Thus, the core is simple to form and shaper is strong and is stable in configuration. Still another advantage of the method of the present invention is that machining and finishing operations on the core are eliminated and the core may be used for the forming of either interior or exterior complex product surfaces, is dimensionally stable and is able to withstand high pressure and in many instances high temperature injection molding procedures.

In one principal aspect of the present invention, a method of removing a molding core from a molded product is provided in which the core comprises a particulate inert material which is formed into a discrete configuration conforming to the configuration of at least a portion of the molded product. The particulate inert material is bound in that configuration by a cured binder comprising a water soluble carbohydrate. The method comprises exposing the bound core in the molded product to water to disintegrate and remove the core from the molded product after the product has been molded.

In another principal aspect of the present invention, the binder may also include a silicate, preferably an alkali earth metal silicate, and more preferably sodium silicate.

In still another principal aspect of the present invention, the water soluble carbohydrate is a saccharide or starch.

In still another principal aspect of the present invention, the binder is cured by heating, preferably by microwave energy.

In still another principal aspect of the present invention, the particulate inert material is selected from the group consisting of sander metal shot, plastic polymers, glass, alumina, clays and mixtures thereof.

In still another principal aspect of the present invention, the water employed to disintegrate and remove the core is heated, preferably to less than about 100° C.

In still another principal aspect of the present invention, the core and molded product are immersed in a bath of the water to disintegrate and remove the core.

In still another principal aspect of the present invention, the water employed to disintegrate and remove the core is steam.

In still another principal aspect of the present invention, the molded product is formed of a material selected from the group consisting essentially of plastics and metals.

These and other objects, features and advantages of the present invention will be more clearly understood upon consideration of the detailed description of the preferred embodiment of the invention which will be described to follow.

BRIEF DESCRIPTION OF THE DRAWING

In the course of this description, reference will be made to the attached drawing in which.

DESCRIPTION OF THE PREFERRED EMBODIMENT

The method of the present invention is directed to the forming of a molded product 10 having at least some surfaces which are of a complex configuration which would otherwise be difficult or incapable of molding without the use of a lost core technique. The product 10 is shown in FIGS. 1 and 2 only as exemplary of one having such complex configuration, it not being intended that the particular shape or use of the product itself form a part of the present invention.

Figure 1:
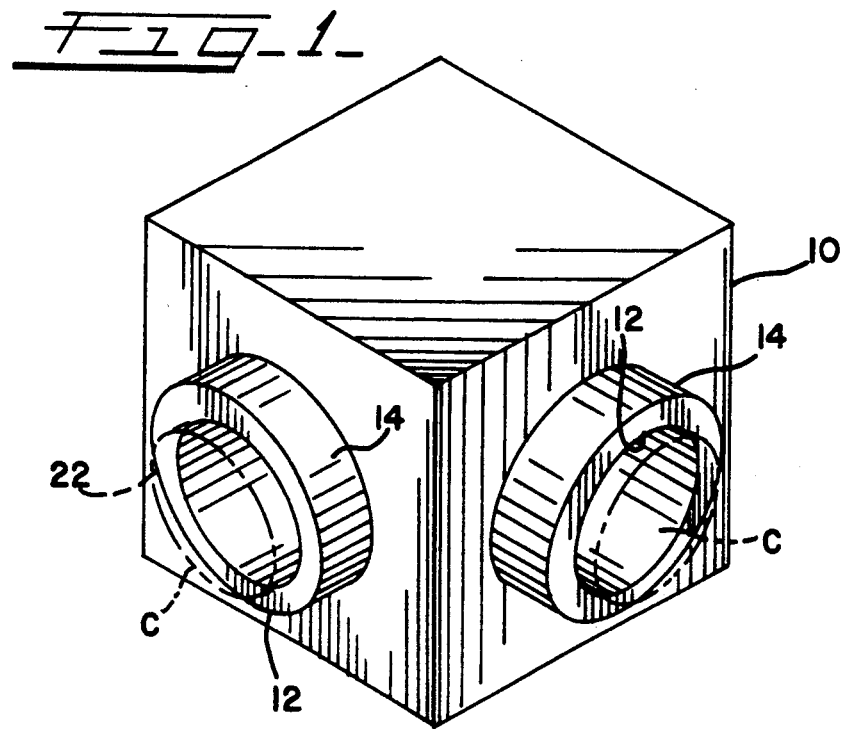
FIG. 1 is a perspective view of a molded product formed in accordance with the principles of the present invention and showing the positioning of a molding core therein.
Figure 2:
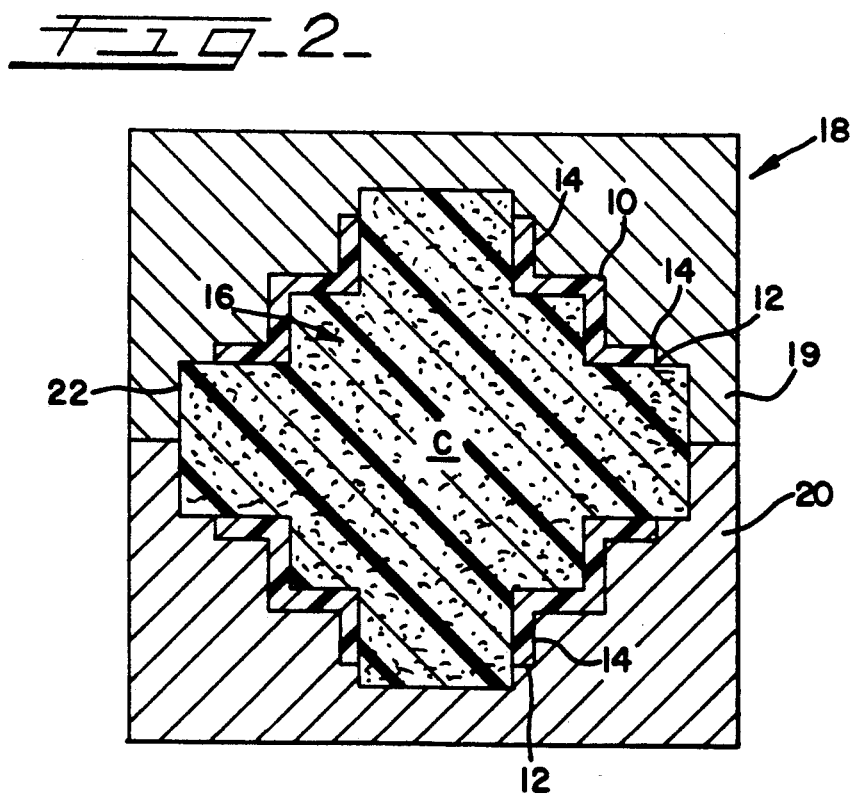
FIG. 2 is a cross-sectioned plan view showing an exterior mold, a molded product therein and a core as employed in the present invention in the product.

By way of example, the product 10 may comprise a molded plastic or metal part or fitting having a generally cubic shape as shown in FIG. 1 with annular ports 12 in each of the side faces of the cube which are defined by annular exterior flanges 14 and a hollow interior cavity 16 as shown in FIG. 2. It will be seen that due for example to the presence of the interior cavity 16, it would be difficult if not impossible to mold the product 10 using only an exterior mold, such as the mold 18 having mold parts 19 and 20 as shown in FIG. 2. Therefore, in order to facilitate the molding of the complex configured product 10, a molding core C is employed which is later removed from the product 10 after the product is removed from the mold.

A preferred core C for practicing the method of the present invention is formed of a particulate inert material which is bound into its desired configuration which is a negative of the surface configuration to be formed in the molded product. The binder preferably comprises a water soluble carbohydrate. A silicate may also be included in the binder.

A wide variety of particulate inert materials, either organic or inorganic, may be employed to form the core. The particulate inert material should have sufficiently high melt and decomposition temperatures to withstand the temperature of the molten materials which are to be into the desired product 10 and are hardly soluble in water. Also they should not react with or be soluble in the material from which the desired molded product is formed, and should not adhere to any great extent to the product material.

A wide variety of sands may be used as the particulate inert material for the core, including most conventional foundry sandal such as 45-130 GFN silica, lake and bank sands. Chromite, zircon and olivine sands can also be used, as well as reclaimed sands. Examples of other particulate inert materials which may be employed as core materials include small steel shot or glass beads or bubbles, small polypropylene pellets, aluminas and clays. A combination of two or more of these materials may also be used.

The water soluble carbohydrate binder may include saccharides, such as dextrose and molasses, and starches such as corn starch. These carbohydrates may be utilized alone as the binder or they may be supplemented with a silicate. The silicate when used is preferably an inorganic alkali earth metal silicate, such as sodium silicate. A suitable silicate-carbohydrate binder for use in the practice of the method of the present invention may be for example Adcosil NF available from Ashland Chemical Inc. which contains approximately 10% dextrose of the total solids, has a $SiO_2/Na_2O$ ratio of approximately 1.95, and a viscosity of approximately 2.1–2.8 Stokes at 25° C.

The molding procedure of the present invention may include injection molding, but is not limited thereto.

The core may include reinforcements such as metal rods, wires or the like in order to strengthen the core. The core may also be coated, if desired, with known non-water based coatings to improve its surface smoothness.

The significant feature of the method of the present invention is that it has been discovered that cores formed of the aforementioned materials may be quickly and easily removed from the molded product simply by exposing the molded product and core to water or steam, preferably heated water. The water may be in the form of pressurized water or steam jets or a bath. If a water bath open to the atmosphere is employed, the temperature of the water is preferably less than 100° C. to avoid the added expense of boiling and the attendant loss of water due to evaporation. It has been found that in the method of the present invention, simple immersion of the molded product in a water bath results in a very rapid, and in some cases almost instantaneous disintegration and removal of the core from the molded product without regard to whether the core has been exposed during the molding process to extreme high metal melt temperatures or low plastic melt temperatures, such as the melt temperature of polyethylene.

Although it is believed that the foregoing description of the present invention together with the knowledge of those skilled in the art are sufficient to enable one in the art to form the core, complete the molding operation and remove the core, a brief description of those steps by way of example follows.

The particulate inert core material and the binder are first mixed in a container. The particulate material, preferably dry, is added to the container and the binder material in the amount of about 5 wt. % in a suitable inert carrier liquid such as water, is added to the particulate material. Where the particulate inert material is sand, after mixing the material in the container has the appearance of wet sand.

The next typical step is to form the molded core by placing a portion of the mixed core material in a core box having a configuration of the desired final complex configuration of the molded product. The core material is then cured in the core box in that configuration by using heat, preferably in the form of microwave radiation. Microwave radiation levels on the order of those of a regular kitchen microwave will cure the core in about 1½ minutes, depending upon the size of the core.

Binders containing silicates have typically been cured in the past by passing carbon dioxide through the core material in the core box. It has been found in the present invention that the use of carbon dioxide to cure such silicate containing binders results in greatly reduced water solubility and greatly increased core removal times. Thus, carbon dioxide curing is not preferred in the present invention. Heat curing is the preferred method of curing. It not only results in excellent water solubility of the core binder, but permits reduction in the amount of the binder material to as little as about 2 wt. % of the particulate material without adverse result on the core strength.

The cured core C which is bound by the cured binder into the configuration in which it is to be inserted into the exterior mold 18 is positioned in the mold. The core C preferably has slightly larger portions than the overall size of the final molded product 10 to form "core prints" 22 to insure accurate positioning of the core C in the mold 18 as shown in FIG. 2.

Once the core C is positioned in the mold 18, the metal or plastic material of which it is desired to form the final molded product 10 is then injected into the remaining spaces in the mold 18 between the core C and the interior faces of the exterior mold 18 parts 19 and 20.

These injected product materials may include a wide range of plastics, including polyesters, nylons, polysulfones, polycarbonates, PTFE or phenolics. They may also include a wide range of metals including aluminum, bronze, brass, steel or iron. It will be understood that the aforementioned materials are not exhaustive of all of the materials which may be molded employing the method of the present invention.

The mold 18 is then cooled in order to solidify the molten molded product material into its final shape.

After the product material has solidified, the mold 18 parts 19 and 20 are separated and the molded product 10 and core C are removed from the mold 18. In accordance with the present invention, they are together exposed to pressurized jets of water or steam or plunged into a water bath. The water is preferably heated in order to accelerate the disintegration and removal of the core material from the molded product 10. It has been found that even cores C of relatively large size completely disintegrate and are removed from the molded product 10 within a matter of 15–30 seconds when immersed in a hot water bath.

The sand from the disintegrated core will settle to the bottom of the water bath and may be readily reclaimed. The silicate, if present, and the dissolved water soluble carbohydrate, if it is still present and has not been decomposed by the heat during molding, are removed from the bath by maintaining a flow of fresh water through the bath.

The following are examples of core materials and binders which may be employed in practicing the method of the present invention. They are given as exemplary only and are not to be considered as limiting the invention.

| Binder | Particulate Inert Material | Comments |
| --- | --- | --- |
| Sodium silicate/ Dextrose[1] | Sand | Good strength. Good water solubility with core disintegrating in less than 1 minute. |
| Pure Corn Starch[2], Sodium silicate/ Dextrose[1] | Sand | Good strength. Even better water solubility than just sodium silicate/dextrose. |
| Molasses[3] | Sand | Fair but acceptable strength. About same water solubility as corn-starch - sodium silicate/dextrose binder. |
| Sodium silicate/ Dextrose[1] | Glass beads | Good strength. Good water solubility with core disintegrating in less than 1 minute. |
| Sodium silicate/ | Steel Shot | Good strength. Good water |

| Binder | Particulate Inert Material | Comments |
|---|---|---|
| Dextrose[1] | | solubility. |

[1] Adcosil NF, Ashland Chemical Inc.
[2] Argo, CPC International Inc.
[3] Grandma's (unsulfured), Motts USA.

In each of the above examples, the amount of binder used (together with its water carrier) was about 5 wt. % of the particulate inert material. Where both sodium silicate/dextrose and an additional carbohydrate binder were employed, they were a 50-50 mixture of each for a total of 5 wt. %.

In each of the above examples, the core disintegrated extremely rapidly—on the order of less than one minute. It has been found that where the cores are exposed to high molten metal temperatures, for example in the molding of aluminum, the core remains water soluble, but the time needed for disintegration is somewhat longer.

Although the core C as shown in the drawings is shown for the formation of an interior cavity in the molded product, it will be appreciated that the term "core" as employed herein is not limited to only the formation of interior surfaces or cavities. The method of the present invention also contemplates the use of molded cores and removal from the molded product for the formation of complex undercut exterior surfaces with equal facility.

It will also be understood that the preferred embodiment of the present invention which has been described is merely illustrative of the principles of the present invention. Numerous modifications may be made by those skilled in the art without departing from the true spirit and scope of the invention.

We claim:

1. A cured dried core for the molding of a molded product, said core comprising in principal part a particulate inert material which is formed into a discrete configuration conforming to the configuration of at least a portion of the molded product, the particulate inert material being bound in said configuration in a dry condition by a heat cured water soluble binder comprising a silicate salt and a water soluble carbohydrate, the dry bound particulate material being flushable from the molded product by water.

2. The core of claim 1, wherein the heat curing of the binder is by microwave energy.

3. The core of claim 1, wherein said water soluble carbohydrate is selected from the group consisting of saccharides and starches.

4. The core of claim 3, wherein the heat curing of the binder is by microwave energy.

5. The core of claim 1, wherein the particulate inert material is selected from the group consisting of sand, metal shot, plastic polymers, glass, alumina, clays and mixtures thereof.

6. The core of claim 5, wherein the heat curing of the binder is by microwave energy.

7. The core of claim 1, wherein said silicate salt is an alkali earth metal silicate.

8. The core of claim 7, wherein the heat curing of the binder is by microwave energy.

9. The core of claim 7, wherein said water soluble carbohydrate is selected from the group consisting of saccharides and starches.

10. The core of claim 9, wherein the heat curing of the binder is by microwave energy.

* * * * *

UNITED STATES PATENT AND TRADEMARK OFFICE
CERTIFICATE OF CORRECTION

PATENT NO. : 5,248,552
DATED : Sep. 28, 1993
INVENTOR(S) : Moore et al.

It is certified that error appears in the above-indentified patent and that said Letters Patent is hereby corrected as shown below:

Col. 2, line 46, delete "corer" and insert --core,--.
Col. 2, line 59, delete "inventions" and insert --invention,--.
Col. 3, line 8, delete "removes" and insert --removed--.
Col. 3, line 14, delete "shaper" and insert --shape,--.
Col. 3, line 48, delete "sander" and insert --sand,--.
Col. 4, line 50, after "be" insert --molded--.
Col. 4, line 57, delete "sandal" and insert --sands,--.
Col. 5, line 14, delete "it" and insert --if--.

Signed and Sealed this

Sixteenth Day of January, 1996

*Attest:*

BRUCE LEHMAN

*Attesting Officer*  *Commissioner of Patents and Trademarks*